United States Patent [19]

Koch et al.

[11] Patent Number: 5,081,216

[45] Date of Patent: Jan. 14, 1992

[54] PREPARATION OF POLYARYL ETHER KETONES BY ELECTROPHILIC POLYCONDENSATION

[75] Inventors: Juergen Koch, Neuhofen; Gerhard Heinz, Weisenheim, both of Fed. Rep. of Germany

[73] Assignee: BASF Aktiengesellschaft, Ludwigshafen, Fed. Rep. of Germany

[21] Appl. No.: 473,408

[22] Filed: Feb. 1, 1990

[30] Foreign Application Priority Data

Feb. 28, 1989 [DE] Fed. Rep. of Germany ........ 3906178

[51] Int. Cl.$^5$ .................. C08G 8/02; C08G 14/00; C08G 75/00
[52] U.S. Cl. .................... 528/125; 528/126; 528/128; 528/172; 528/174; 528/219
[58] Field of Search ............... 528/125, 174, 172, 126, 528/128, 219

[56] References Cited

U.S. PATENT DOCUMENTS

| | | | |
|---|---|---|---|
| 3,441,538 | 4/1969 | Marks | 260/49 |
| 3,442,857 | 5/1969 | Thornton | 528/125 |
| 3,953,400 | 4/1976 | Dahl | 260/47 |
| 4,186,262 | 1/1980 | Freeman et al. | 528/174 |
| 4,636,557 | 1/1987 | Deckers | 528/126 |
| 4,820,790 | 4/1989 | Winslow et al. | 528/128 |
| 4,870,153 | 9/1989 | Matzner et al. | 528/128 |

FOREIGN PATENT DOCUMENTS

| | | |
|---|---|---|
| 0087532 | 9/1983 | European Pat. Off. . |
| 0298771 | 1/1989 | European Pat. Off. . |
| 3241444 | 5/1983 | Fed. Rep. of Germany . |
| 3416445 | 7/1985 | Fed. Rep. of Germany . |
| 3416446 | 11/1985 | Fed. Rep. of Germany . |
| 8403891 | 10/1984 | World Int. Prop. O. . |

*Primary Examiner*—John Kight, III
*Assistant Examiner*—T. Mosley
*Attorney, Agent, or Firm*—Oblon, Spivak, McClelland, Maier & Neustadt

[57] ABSTRACT

The addition of compounds which convert carboxylic acids into their halides in the course of electrophilic polycondensation for preparing polyaryl ether ketones improves the controllability and reproducibility of the process and the properties of the products.

4 Claims, No Drawings

PREPARATION OF POLYARYL ETHER KETONES BY ELECTROPHILIC POLYCONDENSATION

The present invention relates to a process for preparing polyaryl ether ketones by electrophilic polycondensation using carbonyl halides as monomer components in an inert solvent in the presence of a Lewis acid and the presence or absence of a Lewis base.

Polyaryl ether ketones belong to the class of the high temperature resistant thermoplastics which combine good heat resistance with good mechanical properties and an excellent solvent resistance.

In principle, polyaryl ether ketones can be prepared nucleophilically or electrophilically, and the appropriate processes are described in the literature. In the electrophilic process, generally aromatic dicarbonyl halides or phosgene are reacted with suitable aromatic compounds which contain two hydrogen atoms which are displaceable by electrophilic substitution; or an aromatic carbonyl halide which contains not only an acid halide group but also a displaceable hydrogen atom is polycondensed with itself. The catalysts used are in general Lewis acids. U.S. Pat. No. 3,441,538, 3,442,857, 3,953,400, DE-3,241,444, DE-A-3,416,445 and DE-A-3,416,446 describe electrophilic polycondensation reactions using HF as solvent and $BF_3$ as catalyst.

In one version of the process, it is also possible to use halogenated hydrocarbons as solvent and other Lewis acids, e.g. $AlCl_3$, as catalyst.

Finally, according to WO 84/03891 and WO 84/03892, it is advantageous to carry out the reaction in the presence of a Lewis base.

All electrophilic polycondensation processes have in common the use of aromatic carbonyl halides, in particular chlorides, or of phosgene as monomers. However, aromatic carbonyl halides are not stable to storage since they react with traces of moisture to hydrolyze to the corresponding carboxylic acids; they do not even have an unlimited shelf life if moisture is excluded. The hydrolysis products lead to incomplete conversion in the polycondensation and hence to products having a low molecular weight.

Another factor is that unconverted carboxyl groups, lacking thermal stability, lead to problems in processing, since the melt stability of the polymers is reduced and $CO_2$ which has been eliminated by decarboxylation leads to foaming of the polymer melt.

Equally, regulation of the molecular weight is not wholly satisfactory if contaminated carbonyl halides are used, since the molecular weight is then essentially determined by the contaminants.

To avoid all of these problems, it has hitherto been necessary to employ costly measures (e.g. recrystallization or distillation) to purify the carbonyl halides immediately before use. It will be readily understood that this expense is unacceptable for an industrial process.

It is an object of the present invention to provide a process for preparing polyaryl ether ketones by electrophilic polycondensation without incurring the above-described problems which, even if monomers are used which have not been purified immediately prior to the polycondensation, produces polymers of high melt stability and a high molecular weight. In addition, the molecular weight should be efficiently and easily controllable.

We have found that this object is achieved according to the present invention by a process for preparing a polyaryl ether ketone by electrophilic polycondensation in an inert solvent in the presence of a Lewis acid as catalyst and in the presence or absence of a Lewis base using a carbonyl halide as monomer component, by adding to the reaction mixture in an amount of from 0.1 to 10 mol %, based on the amount of carbonyl halide used, a compound which converts a carboxylic acid into the corresponding carbonyl halide. Preferred embodiments of the process according to the present invention may be found in the subclaims and the detailed description which follows.

The claimed process is suitable for preparing polyaryl ether ketones built of any desired repeat units, i.e. basically any polymer where the main chain is made up of aromatic units essentially joined together by -CO- or -O- linkages. Besides these linkages, other linking units may also be present in minor amounts.

Preferably, the polyaryl ether ketones have repeat units of the general formulae I and/or II or their ring-substituted a $C_1$-$C_6$-alkyl, $C_1$-$C_6$-alkoxyaryl, chlorine or fluorine derivatives.

Units of the general formula I have the structure

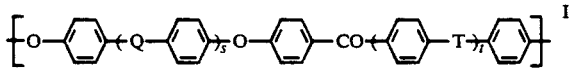

where s and t are each 0, 1, 2 or 3 and Q and T may each be -O- or -CO-.

Units of the general formula II have the structure

where $Ar^1$, $Ar^2$, $Ar^3$, $Ar^4$ and $Ar^5$ are each independently of the others m-phenylene, p-phenylene, biphenylene or naphthylene or a $C_1$-$C_6$-alkyl, $C_1$-$C_6$-alkoxyaryl, chlorine or fluorine derivative thereof, Q' and T' are each -O- or -CO-, and s' and t' are each 0, 1, 2 or 3, with the proviso that at least one of $Ar^1$, $Ar^2$, $Ar^3$, $Ar^4$ and $Ar^5$ is m-phenylene, biphenylene or naphthylene or a $C_1$-$C_6$-alkyl, $C_1$-$C_6$-alkoxy, aryl, chlorine or fluorine derivative thereof.

Representatives of repeat units which come under the general formula I are the following:

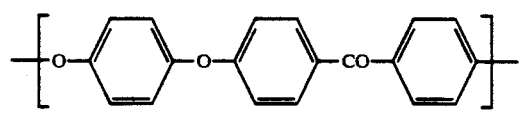

(II)

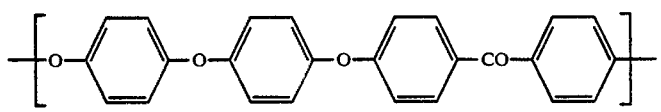 (I2)

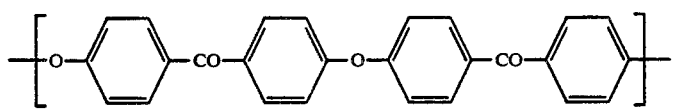 (I3)

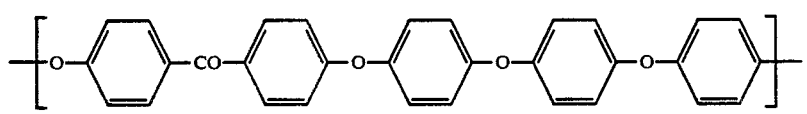 (I4)

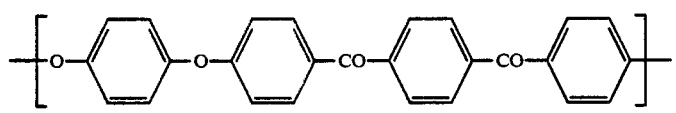 (I5)

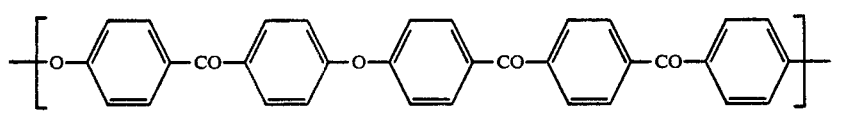 (I6)

In the case of the polyaryl ether ketones of repeat units of the general formula II, those where the two substituents Q' and T' are each -CO- and those where the repeat units of the general formula II have the following structure:

where the aromatic rings may be substituted by $C_1$-$C_6$-alkyl, $C_1$-$C_6$-alkoxy, aryl, chlorine or fluorine and Q', T', s' and t' are each as defined in claim 1, are preferred.

Representative examples of repeat units of the general formula II are the following:

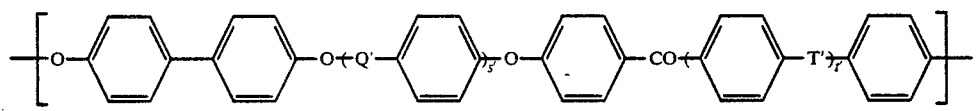

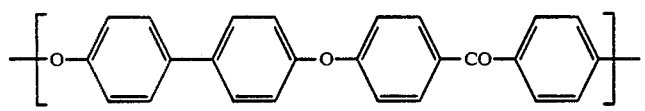 (II1)

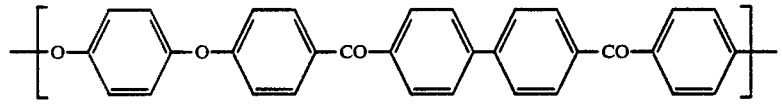 (II2)

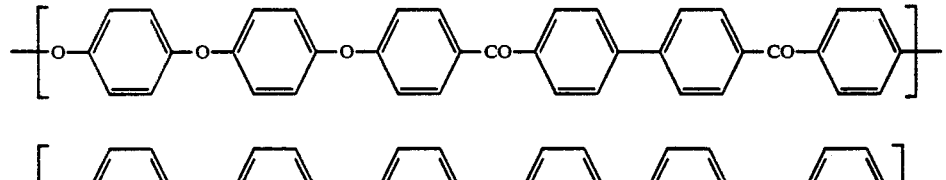 (II3)

(II4)

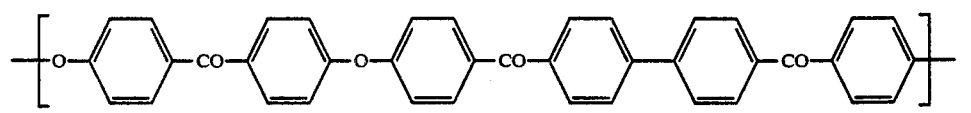 (II5)

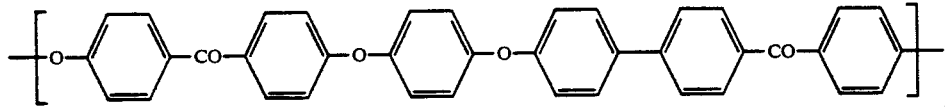

The biphenylene in the formulae (II1)-(II6) may be replaced by naphthylene units.

The preparation of polyaryl ether ketones of the above-described structure by electrophilic polycondensation can be represented in principle by three general equations:

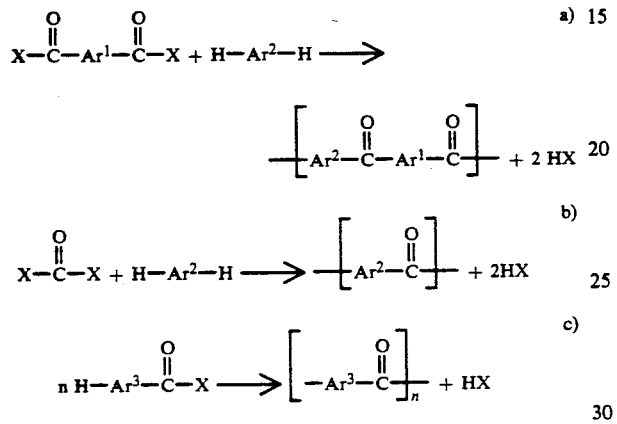

In these general equations, X is Cl, Br, F or I, preferably Cl, and Ar$^1$, Ar$^2$ and Ar$^3$ are each divalent aromatic radicals selected according to the repeat units of the desired polyaryl ether ketones.

For instance, the polyaryl ether ketone composed of repeat units of formula I3 can be obtained by reacting phosgene with diphenyl ether by general equation b), and a polyaryl ether ketone composed of units of the formula I6 can be obtained by reacting terephthaloyl dichloride with 4,4'-diphenoxybenzophenone.

In these cases the reaction equations are

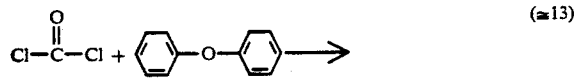

(≈I3)

and,

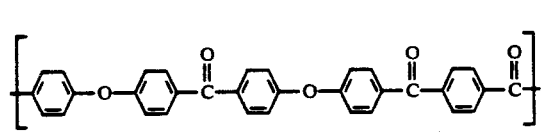

(≈I6)

The polyaryl ether ketones composed of the other repeat units represented above are obtained by choosing the starting compounds accordingly.

Preferred carbonyl halides

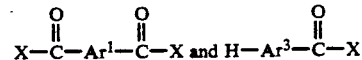

are compounds in which Ar$^1$ and Ar$^3$ each have the following

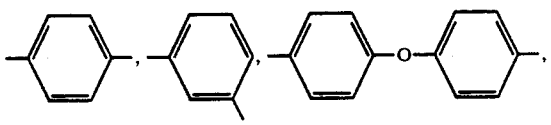

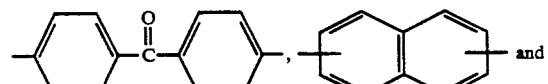

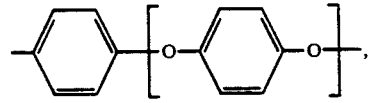

of which the first three compounds mentioned are particularly preferred. Further suitable acid halides are described for example in U.S. Pat. No. 3,956,240.

Preferred compounds HAr$^2$H as per the above reaction equations are for example diphenyl ether, 4,4'-diphenoxybenzophenone, 1,4-diphenoxybenzene and 4-phenoxybiphenyl. Further suitable compounds are for example revealed in previously cited U.S. Pat. No. 3,956,240 and 4,239,884, which are each hereby expressly incorporated herein by reference for further details.

It may also be possible to add monofunctional compounds which produce end group blocking in the products formed. Compounds of this type are known to the person skilled in the art and have been described in the literature The electrophilic polycondensation of the above-described monomers is carried out in a solvent which is inert under the reaction conditions in the presence of a Lewis acid. This Lewis acid is used in a molar excess, based on the molar amount of carbonyl groups or acid halide used, the magnitude of the molar excess being such that the reaction is catalyzed. In general, an excess of from 2 to 80, preferably from 5 to 30, mol % of Lewis acid, based on the amount of active carbonyl groups involved in the reaction, is sufficient for this purpose.

The necessary excess does of course also depend on the nature of the monomers used. If basic groups (e.g. sulfone groups) are present in comonomers, it may be necessary to use a higher excess of Lewis acid.

The words Lewis acid cover for the purposes of the present invention basically all compounds which are capable of accepting a lone electron pair from another compound. Examples are AlCl$_3$, AlBr$_3$, Sb$_2$Cl$_5$, Sb$_2$F$_5$, InCl$_3$, GaCl$_3$, BCl$_3$, BF$_3$, ZnCl$_2$, FeCl$_3$, SnCl$_4$, TiCl$_4$ and MoCl$_5$, of which in particular anhydrous AlCl$_3$ is preferred.

In a preferred embodiment of the process, the polycondensation is carried out in the presence of from 0.01 to 4 moles, preferably from 0.05 to 2 moles, of a Lewis base per mole of acid halide groups. The Lewis acid controls the reaction to a certain extent and suppresses inter alia undesirable side reactions (for example the ortho substitution of activated aryloxy groups). Suitable Lewis bases for these purposes are described in detail in WO 84/03891, which is hereby likewise incorporated herein by reference for further details. Examples are amides, amines, esters, ethers, ketones, nitriles, nitro compounds, phosphines, phosphine oxides, sulfides, sulfones, sulfonamides and sulfoxides, although care should be taken to ensure that the Lewis base does not on the one hand have an acylated, alkylating or arylating action and on the other is not itself acylated.

Preferred Lewis bases are N-methylformamide, N,N-dimethylformamide, N,N-dimethylacetamide, 1-methyl-2-pyrrolidone, acetone, benzophenone and alkali metal chlorides to name but a few.

The inert solvents used are preferably polar solvents whose dielectric constant is not less than 2.5, preferably from 4.0 to 25 (at 25° C.). Examples are methylene chloride, carbon sulfide, 1,2-dichloroethane, 1,1,2,2-tetrachloroethane, 1,2-dichlorobenzene and mixtures thereof.

A useful combination of Lewis acid and solvent is $BF_3$ and HF.

The temperature at which the reaction is carried out is in general within the range from $-50°$ to $+150°$ C., preferably within the range from $-20°$ to $+50°$ C.

It will be readily understood that all solvents and monomers used should be extremely anhydrous.

It is an essential step of the process according to the present invention comprises adding to the reaction mixture from 0.1 to 10 mol %, preferably from 0.2 to 8 mol %, based on the amount of carbonyl halide used, of a compound which converts carboxylic acids into their corresponding carbonyl halides, preferably their chlorides.

Advantageously, the compound is added to the reaction mixture prior to the start of the polycondensation, in particular prior to the addition of the acid halide, but in principle it can also still be added during the condensation, as long as no undesirable reactions have as yet occurred.

Compounds suitable for this purpose are in particular halogen compounds of phosphorus and of sulfur, the halogen compounds of phosphorus being preferred. Examples are $PCl_3$, $POCl_3$, $PCl_5$ and $SOCl_2$, of which phosphoryl trichloride is preferred.

After the polycondensation has taken place, the reaction mixture is worked up in a conventional manner. Preferably, a Lewis base is added for the purpose of degrading the Lewis acid/polymer complex and any amounts still present of the compound which was added to convert the acid into its halide. Examples of such Lewis bases are given in previously cited WO 84/03891. Preference is given to water and methanol and mixtures thereof. Following this decomplexing with or without comminution, the product may additionally be purified by extraction with a suitable solvent.

The process according to the present invention makes it possible to prepare high molecular weight polyaryl ether ketones of high melt stability in a simple manner which also permits the simple and accurate control of the molecular weight. The reproducibility of the process does not depend on freshly purified monomers being used.

EXAMPLE 1 (COMPARISON)

Nonstoichiometric ratio of the monomers, end group blocking

A one-L three-necked flask equipped with a stirrer and nitrogen inlet means was charged with 200 ml of dried methylene chloride. 147.335 g (1.105 mol) of anhydrous aluminum trichloride were suspended therein at $-20°$ C. 28.239 g (0.300 mol) of dimethyl sulfone were then slowly added, followed in succession at $-15°$ C. by 1.012 g (0.007 mol) of benzoyl chloride, 40.605 g (0.200 mol) of terephthaloyl dichloride (freshly distilled, bp 266° C.) and 74.603 g (0.204 mol) of diphenoxybenzophenone. The buffers and powder funnels for weighing out and metering in the materials were rinsed out with 20 ml of dry methylene chloride.

The temperature was increased to 25° C. in the course of 20 minutes and the solidifying reaction mixture was maintained at that temperature for 4 hours. The rubber-like mass was then removed from the flask, precomminuted by cutting with a knife, decomplexed in a food blender with 2 liters of ice-water, and further comminuted. The polymer flakes obtained were extracted 5 times for 30 minutes with 5 liters of boiling water and dried at 150° C. under reduced pressure.

The polymer obtained had the structure

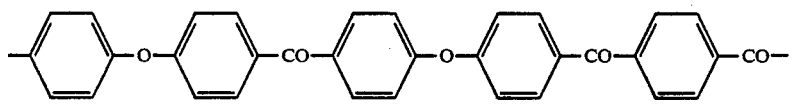

and an intrinsic viscosity of 1.121 (measured in concentrated sulfuric acid, 0.5 g/100 ml at 25° C.).

EXAMPLE 2 (COMPARISON)

Example 1 was repeated, except that no freshly distilled terephthaloyl dichloride was used, but terephthaloyl dichloride from Dupont which had been stored in an air-tight plastic bag for about 9 months.

A polymer having an intrinsic viscosity of 0.837 was obtained.

EXAMPLE 3

Example 2 was repeated, except that 1.533 g (0.010 mol) of phosphoryl chloride was added after the addition of dimethyl sulfone and before the addition of benzoyl chloride.

A polymer having an intrinsic viscosity of 1.115 was obtained.

EXAMPLE 4

Example 3 was repeated, except that the phosphoryl chloride was replaced by 2.082 g (0.010 mol) of phosphorus pentachloride.

A polymer having an intrinsic viscosity of 1.119 was obtained.

EXAMPLE 5 (COMPARISON)

Stoichiometric ratio of the monomers, no end group blocking

The reaction conditions described in Example 1 were employed to react:
 Aluminum chloride (144.007 g, 1.080 mol)
 Dimethyl sulfone (28.239 g, 0.300 mol)
 Terephthaloyl chloride (40.605 g, 0.200 mol)
 Diphenoxybenzophenone (73.283 g, 0.200 mol).

The terephthaloyl chloride used was the same as in Example 2.

A polymer having an intrinsic viscosity of 1.073 was obtained.

EXAMPLE 6

Example 5 was repeated, except that 1.533 g (0.01 mol) of phosphoryl chloride was added after the addition of dimethyl sulfone and before the addition of terephthaloyl chloride.

A polymer having an intrinsic viscosity of 2.667 was obtained.

EXAMPLE 7

A 500 ml three-necked flask equipped with a stirrer and a nitrogen inlet means was charged with 200 ml of dried 1,2-dichloroethane in which, after cooling to −20° C., 160.008 g (1.200 mol) of aluminum chloride were suspended. 25.434 g (0.600 mol) of lithium chloride were then added at −20° C., followed by 1.533 g (0.01 mol) of phosphoryl chloride and, still at −20° C., by 89.467 g (0.400 mol) of p-phenoxybenzoyl chloride, added dropwise. Following rinsing with 20 ml of 1,2-dichloroethane, the temperature was slowly raised to 0° C. in the course of an hour. The stirrer was then switched off, and the reaction mixture was left at 0° C. for 24 hours to complete the condensation. The rubber-like mass was mechanically removed from the flask, precomminuted by cutting with a knife, and then decomplexed, and further comminuted, in a food blender with 2 liters of distilled water. The raw polymer thus obtained was extracted 5 times for 30 minutes with 5 liters of boiling water and dried at 150° C. under reduced pressure.

The polymer thus prepared had the structure:

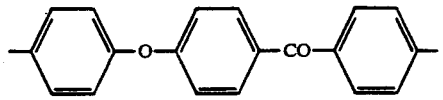

and an intrinsic viscosity of 3.674.

The products obtained in Examples 3, 4, 6 and 7 showed good processing melt stability, superior to that of the products of Examples 1, 2 and 5.

We claim:

1. A process for preparing a polyaryl ether ketone by electrophilic polycondensation in an inert solvent in the presence of a Lewis acid and in the presence or absence of a Lewis base using a carbonyl halide as monomer component, by adding to the reaction mixture in an amount of from 0.1 to 10 mol %, based on the amount of carbonyl halide used, a compound which converts a carboxylic acid into the corresponding carbonyl halide.

2. A process as claimed in claim 1, wherein the compound which converts carboxylic acids into their halides is added before or together with the carbonyl halide 3. A process as claimed in claim 1, wherein the polycondensation is carried out in the presence of a Lewis base.

4. A process as claimed in claim 1, wherein the compound which is used to convert the carboxylic acid into its halide is a halogen compound of phosphorus or of sulfur.

* * * * *